(12) United States Patent
Dove et al.

(10) Patent No.: US 8,706,093 B2
(45) Date of Patent: Apr. 22, 2014

(54) PREDICTIVE CALENDAR

(75) Inventors: Antony Michael Dove, Bradford (GB); Andrew Stanford, Baildon (GB)

(73) Assignee: Eldon Technology Limited, Steeton (GB)

( * ) Notice: Subject to any disclaimer, the term of this patent is extended or adjusted under 35 U.S.C. 154(b) by 597 days.

(21) Appl. No.: 12/702,910

(22) Filed: Feb. 9, 2010

(65) Prior Publication Data

US 2011/0194028 A1    Aug. 11, 2011

(51) Int. Cl.
*H04M 3/42* (2006.01)

(52) U.S. Cl.
USPC ............... 455/414.1; 455/403; 455/414.2

(58) Field of Classification Search
USPC ............... 455/414.1–414.4, 404.2, 403
See application file for complete search history.

(56) References Cited

U.S. PATENT DOCUMENTS

| | | | |
|---|---|---|---|
| 2005/0233743 A1 | 10/2005 | Karaoguz et al. | |
| 2008/0091445 A1* | 4/2008 | Mihic | 705/1 |
| 2009/0006994 A1 | 1/2009 | Forstall et al. | |
| 2009/0106077 A1 | 4/2009 | Bhogal et al. | |
| 2009/0248807 A1* | 10/2009 | Fron et al. | 709/206 |
| 2010/0205628 A1* | 8/2010 | Davis et al. | 725/25 |

FOREIGN PATENT DOCUMENTS

EP    2219141    8/2010

OTHER PUBLICATIONS

European Search Report dated Aug. 5, 2011, EP 11153860.9, 7 pages.

* cited by examiner

*Primary Examiner* — Ajit Patel
(74) *Attorney, Agent, or Firm* — Seed IP Law Group PLLC

(57) ABSTRACT

A method for obtaining content using a calendar application is executed on a first electronic device. The method may include receiving travel parameters from a first user through a user interface of the calendar application. The travel parameters may include a destination and a date of travel. The method may further include obtaining destination information from a content source communicatively coupled to the first electronic device based on the travel parameters and notifying the first user of the obtained destination information at a predetermined time before the date of travel.

9 Claims, 4 Drawing Sheets

PREDICTIVE CALENDAR

FIELD

Embodiments disclosed herein relate generally to calendar applications and, more particularly, to a predictive calendar application for providing destination and contact information.

BRIEF SUMMARY

The various embodiments disclosed herein may relate to routing a data signal between two or more components. One embodiment of a method for obtaining content using a calendar application executed on a first electronic device includes receiving travel parameters from a first user through a user interface of the calendar application. The travel parameters may include a destination and a date of travel. The method may further include obtaining destination information from a content source communicatively coupled to the first electronic device based on the travel parameters and notifying the first user of the obtained destination information at a predetermined time before the date of travel.

The present disclosure also relates to a method for managing contacts using a calendar application. The method may include receiving first travel parameters from a first user through a first user interface of a first calendar application. The first calendar application may be executed on a first electronic device, and the first travel parameters may include a first destination and a first set of travel dates or times. The method may also include receiving second travel parameters from a second user through a second user interface of a second calendar application. The second calendar application may be executed on a second electronic device, and the second travel parameters may include a second destination and a second set of travel dates or times. The method may further include determining, at a predetermined time prior to the first set of travel dates or times, whether the first and second users will be present in a particular destination for at least a partially overlapping period of time based on the first and second travel parameters.

The present disclosure also relates to a system for managing a calendar application. The system may include a first electronic device communicatively coupled to a network. The first electronic device may execute a first calendar application configured to receive first travel parameters from a first user including a first destination and a first set of times or dates. The system may further include a second electronic device communicatively coupled to a network. The second electronic device may execute a second calendar application configured to receive second travel parameters from a second user including a second destination and a second set of times or dates. The first calendar application may be configured to determine, at a predetermined time prior to the first set of travel dates or times, whether the first and second users will be present in a particular destination for at least a partially overlapping period of time based on the first and second travel parameters. In some embodiments, the network may include a server configured to receive and store the first travel parameters from the first user and the second travel parameters from the second user.

DETAILED DESCRIPTION

I. Overview and Definitions

Generally, embodiments described herein disclose systems, apparatuses and methods for implementing a predictive calendar application The calendar application may be a software application that can be executed on one or more of various electronic devices. The user interface of the calendar application may prompt a user to input various travel parameters, such as dates and/or times of intended travel and the user's intended destination. Additionally, the user interface of the calendar application may allow a user to search for various contacts and create a contact list. In one embodiment, the calendar application may be configured to compare the user's travel parameters with a contact's travel parameters to determine any overlapping time periods and/or destinations for the user and contact. The calendar application may further be configured to notify the user and/or the contact as to any overlapping time periods and/or destinations. In this manner, a user may be alerted that certain contacts will be in the same or a nearby place, at the same time, as a user. It should be noted that these notifications generally are provided predictively. That is, the notifications are typically provided before a user embarks on a trip or otherwise reaches a destination as opposed to being provided in real-time.

The calendar application may further be configured to obtain destination information from a content source communicatively coupled to the user's electronic device based on the travel parameters. In one embodiment, the destination information may include local or non-local television and/or radio signals obtained from a local or non-local content provider. The calendar application may be configured to search for relevant programming by searching program titles and/or descriptions of an electronic program guide. In another embodiment, the calendar application may also be configured to obtain destination information from the Internet, or some other network.

A "network," as used herein, is a group of communication devices connected to one another and capable of passing data therebetween. As such, a network may be the Internet, a computer network, the public-switched telephone network, a wide-area network, a local area network, a cellular network, a global Telex network, or any other wired or wireless network.

This document also refers to "destination information." As used herein, "destination information" includes any information relating to a particular location or destination, or an area in the vicinity of the location or destination. "Destination information" may take the form of various types of data such as text, graphics, and audio and/or visual content, including television, radio, and web-based content and/or applications, advertisements, and so on and so forth.

II. Operating Environment

Figure 1:
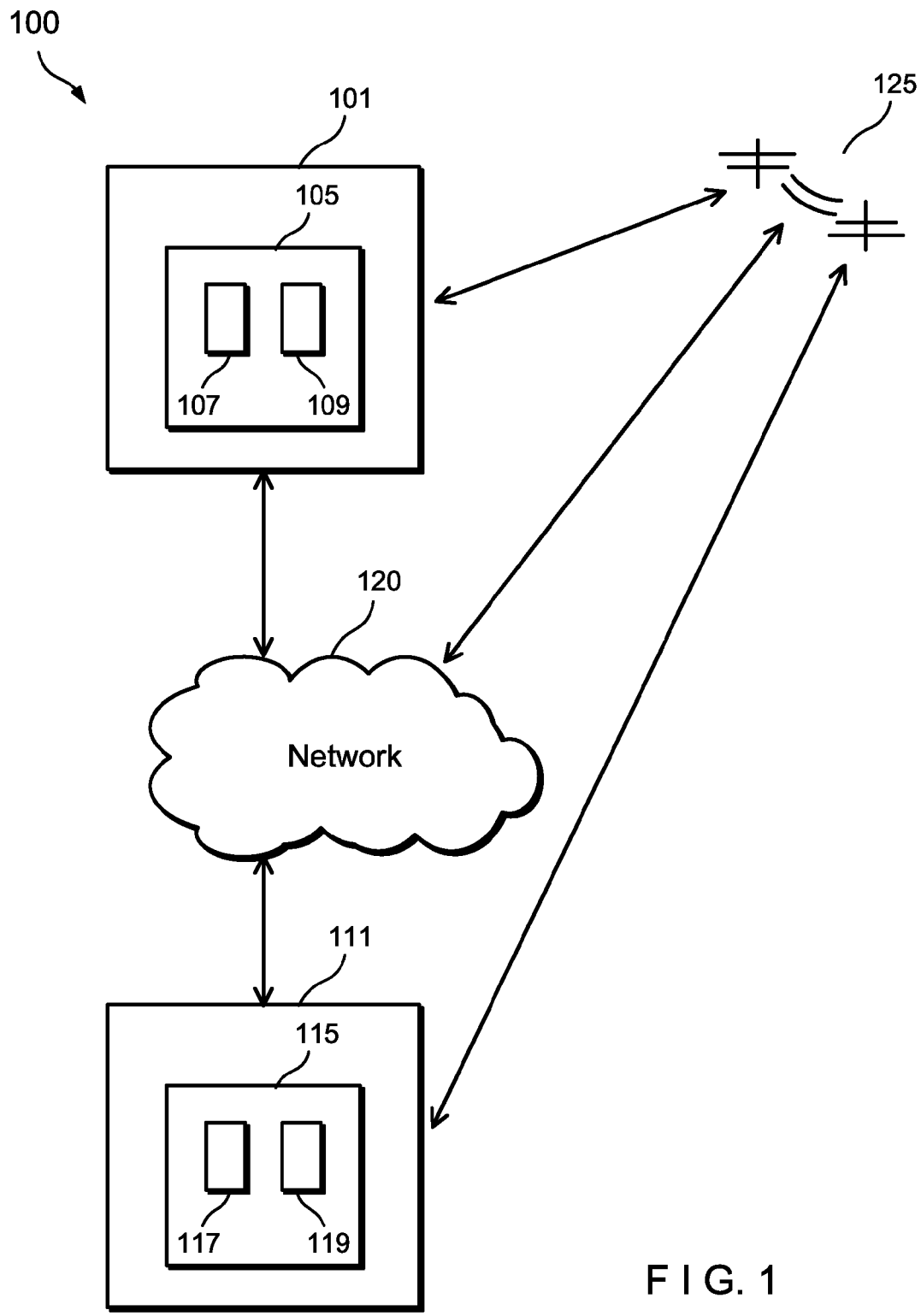
FIG. 1 depicts a sample operating environment for a predictive calendar application.

FIG. 1 depicts a sample environment 100 in which a user may employ a predictive calendar application 105, 115. The calendar application 105, 115 may be configured to provide an electronic calendar as well as other functions, such as an electronic appointment book, address book, and/or contact list. The application may likewise present a user interface through which a user may manage these functions. In one embodiment, the calendar application 105, 115 may also be configured to display the user's calendar in a plurality of different formats, such as in monthly, weekly, daily, and/or hourly views. These and other functions may be accessed and managed by a user via a graphical user interface ("GUI"). For example, the GUI of the calendar application 105, 115 may permit users to add contacts and schedule meetings, appointments and/or trips to various destinations.

As shown in FIG. 1, the environment 100 may include various electronic devices 101, 111. The electronic devices 101, 111 may be any type of electronic device including, but not limited to, a personal computer, such as a laptop, tablet PC or a handheld PC, a PDA, a mobile telephone, a television receiver, and so on and so forth. In one embodiment, the electronic device 101, 111 may be a receiver connected to a display, such as a television receiver or a desktop computer.

The electronic devices 101, 111 may be operated by different users, and optionally in different locations. For example, the user of the electronic devices 101, 111 may be located in a different building, street, town, city, state, and/or country from the user of the other electronic device 101, 111. Alternatively, the users of the electronic devices 101, 111 may be located in the same location.

The electronic devices 101, 111 may each be configured to run instances of the calendar application 105, 115 that is stored at each electronic device. The application 105, 115 may be stored, for example, in an internal or external memory or other storage device. Further, the electronic devices 101, 111 may include a processing device, such as a microprocessor, central processing unit ("CPU") or other processing device capable of executing the calendar application 105, 115. As shown in FIG. 1, the electronic devices 101, 111 may each be communicatively connected to a network 120 configured to allow communication between the electronic devices themselves or between the devices and other nodes within the network. For example, the network 120 may be configured to pass data signals between the electronic devices 101, 111, including text messages, emails, between electronic devices, audio and/or visual signals, and so on.

A content provider 125 transmitting content signals may also be connected to the network 120. The content provider 125 may be any type of content provider, including a cable provider, a broadcast television provider, a satellite provider, a radio provider, and so on and so forth. The content signals may be any digital or analog signal, including any data, audio and/or video signal. For example, the content signals may include satellite television and/or radio signals that are broadcast by a satellite provider. In one embodiment, the network 120 may be configured to receive the content signals from the content provider 125 and transmit the content signals to the electronic devices 101, 111. As shown in FIG. 1, the electronic devices 101, 111 may each be communicatively connected to a network 120 configured to allow communication between the electronic devices themselves or between the devices and other nodes within the network.

Figure 2:
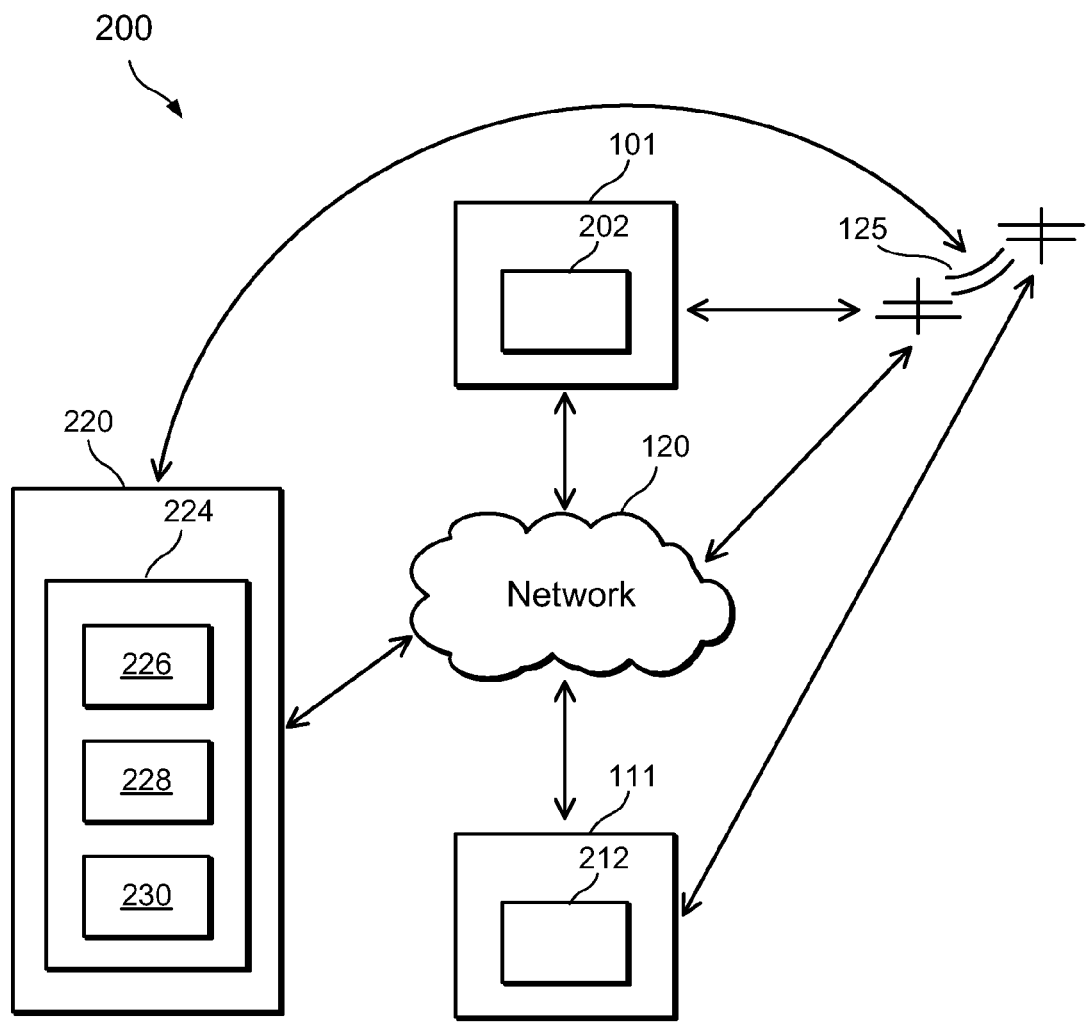
FIG. 2 shows another sample operating environment for a predictive calendar application.

FIG. 2 depicts a sample distributed environment 200 in which a user may employ a predictive calendar application. In this embodiment, the calendar application 224 may be stored on a separate server 220, rather than on the electronic devices 101, 111. The server 220 and the electronic devices 101, 111 may be connected to a network 120. Further, as discussed above with respect to FIG. 1, a content provider 125 transmitting content signals may also be connected to the network 120.

Referring to FIG. 2, the electronic devices 101, 111 may include respective clients 202, 212 that are configured to access the server 220 through the network 120. As non-limiting examples, the client 202, 212 may include a fat client, a thin client, a hybrid client, or any other client that may function within a client-server computing architecture. The server 220 may be any hardware or software that is configured to allow access of the calendar application 224 by the clients 202, 212. For example, the server 220 may include a computer running a server operating system, and may be a shared server, a dedicated server, a standalone server, and so on and so forth.

The environments 100, 200 described with respect to FIGS. 1 and 2 are provided for explanatory purposes only. For example, the environment may include any number of electronic devices, networks, content providers, and/or servers. Additionally, other embodiments may have more or less distributed environments. For example, the environment may include a second server that is communicatively coupled to the network 120 and configured to store one or more applications of the calendar application.

III. Communications and Connections

In FIG. 1, the electronic devices 101, 111 may be operationally, directly, indirectly, functionally or otherwise connected to the network 120, as well as to the content provider 125. Communications between the electronic devices 101, 111, the network 120, and the content provider 125 may be unidirectional or bi-directional, and may be provided through various interfaces such as a high definition multimedia interface ("HDMI") cable, a co-axial cable, structured cable, Ethernet, wireless interface, combinations thereof, and so on.

In FIG. 2, the electronic devices 101, 111 may be operationally, directly, indirectly, functionally or otherwise connected to the network 120, as well as to the content provider 125. Communications between the electronic devices 101, 111, the network 120, and the content provider 125 may be unidirectional or bi-directional, and may be provided through various interfaces such as an HDMI cable, a co-axial cable, structured cable, Ethernet, wireless interface, combinations thereof, and so on.

Similarly, the server 220 may be operationally, directly, indirectly, functionally or otherwise connected to the network 120, as well as to the content provider 125. Communications between the server, the network 120, and the content provider 125 may be unidirectional or bi-directional, and may be provided through various interfaces such as an HDMI cable, a co-axial cable, structured cable, Ethernet, wireless interface, combinations thereof, and so on.

IV. The Predictive Calendar Application i. Contact Management

The calendar application 105, 115 may be configured to create a user profile based on personal parameters inputted by the user. For example, the user profile may include and or all of the user's name, date of birth, contact information (which may include the user's residential address and personal phone number(s)), the user's work address and work phone number(s), and so on and so forth.

The calendar application 105, 115 may further be configured to receive and store the user's trip parameters 107 and contact information 109 for the user's contacts. The user's trip parameters 107 may include, but are not limited to, any particular destinations (e.g., a building, establishment, street, town, city, state, and/or country) that the user plans to visit, as well as the dates and/or times that the user plans to visit the designated destinations. In addition, the trip parameters 107 may include an event that the user plans to attend, such as a conference, meeting, appointment, trade show, or any other public or private event. The trip parameters 107 may be inputted by the user through the GUI of the calendar application 105, 115, may be automatically downloaded from the user's electronic device 101, 111 without requiring additional input from the user, or may be otherwise accessed or retrieved by the calendar application.

The contact information 109 may include the name of a contact person or an entity, such as a company or other organization. The contact information 109 may further include any additional contact information associated with the contact, such as an email address, telephone number, work and/or residential addresses, and so on and so forth. The contact information 109 may be input by the user, for example, through the GUI of the calendar application 105, 115 and/or imported from the contact's electronic device 101, 111, as will be further described below. The electronic devices 101, 111 may receive and store trip parameters 107 and/or contact information 109 from all or some of the electronic devices connected to the network 120.

In one embodiment, the calendar application 105, 115 GUI may prompt the user to enter particular travel parameters 107, 117, including the type of travel, i.e., whether the user is traveling for vacation, business, a meeting, an appointment, etc., the user's destination, and the time(s) that the user will be present in the destination. Additionally, the calendar application 105, 115 may include a search function for allowing the user to search for and select a particular location or destination from a list of prestored destinations. With respect to the list of contacts 109, 119, the calendar application 105, 115 may include a search function to allow the user to search for other users in the network 120, for example, by prompting the user to enter the contact's name, or some other identifying feature, such as the contact's email address.

The operation of an example predictive calendar application 105, 115 will now be described with respect to the embodiment shown in FIG. 1. As discussed above, the embodiment may include a first user operating a first electronic device 101 and a second user operating a second electronic device 111. As an example, the first user may add the second user to his or her contact list, for example, using the search function described above, and the calendar application 105 of the first user may transmit an invitation to the second user's electronic device 111. If the second user accepts the first user's invitation, then the second user may be added to the first user's list of contacts 109. The calendar application 115 of the second user may then transmit the second user's contact information to the electronic device 101 of the first user, and the calendar application 105 of the first user may import the received contact information. Similarly, the calendar application 105 of the first user may transmit the first user's contact information to the electronic device 111 of the second user, and the calendar application 115 of the second user may import the received contact information. However, if the second user does not accept the first user's invitation, then the second user may not be added to the first user's list of contacts.

Once the first and second users are confirmed contacts, their respective calendar applications 105, 115 may periodically transmit any entered travel parameters 107, 117 to the other user's electronic device 101, 111. The frequency at which the travel parameters 107, 117 are transmitted and imported by the other user's electronic device 101, 111 may vary from embodiment to embodiment. For example, the travel parameters 107, 117 may be transmitted as soon as a user updates his or her calendar, several times a minute, hourly, daily, and so on and so forth. Similarly, the frequency at which the transmitted travel parameters 107, 117 are received may vary from embodiment to embodiment. For example, the travel parameters 107, 117 may be received when a user runs the calendar application 105, 115, turns on his or her electronic device 101, 111, and/or at any other time interval specified by the user.

Upon receiving the travel parameters 107, 117 of a contact, the calendar application 105, 115 may compare the received parameters with those entered by the user. For example, the calendar application 105, 115 may be configured to reference the contact's input travel parameters 107, 117 and contact information 109, 119 (listing the contact's residential and/or work addresses) to determine the geographical location of the contact for a particular date and time. The calendar application 105, 115 may further be configured to determine the corresponding geographical location of the user by referencing the user's input travel parameters 107, 117 and user profile (listing the user's residential and/or work addresses), and to compare the user's determined location with the contact's determined location. The calendar application 105, 115 may be configured to make the above-described comparison at a user-defined time before a particular date, for example, one day, one week, one month, or any other time period. Additionally, the comparison may be continually updated as a particular date approaches, for example, if the user and/or contact changes his or her travel parameters 107, 117, e.g., if a trip is canceled, shortened, and so on.

In one embodiment, if the user's location matches the contact's location for a particular date and/or time, then the calendar application 105, 115 may transmit an alert to both the user and the contact's respective electronic devices 101, 111. The alert may include a notification that the contact and the user will be present in a particular location for an overlapping period of time. The alert may also include the overlapping dates and/or times of the contact and the user's presence in a particular location, the specific dates and/or times that the contact and/or user may be present in the location, the contact and/or user's itinerary or schedule while in the location, and so on and so forth.

The calendar application 105, 115 may also be configured to generate a list of contacts that will be present in a particular location for a period of time that overlaps with the user's presence in the location. In one embodiment, the calendar application 105, 115 may be configured to filter the contact list based on the type of travel indicated by the user in the travel parameters 107, 117. For example, if the user indicates that he or she is traveling for work, then the calendar application 105, 115 may be filtered to only include the user's work contacts, as well as any other contacts designated by the user as being appropriate for work travel. As another example, if the user indicates that he or she is traveling for vacation, then the calendar application 105, 115 may be filtered to include a different set of contacts, as designated by the user.

In some embodiments, the calendar application 105, 115 may prompt the user to input one or more default locations that can be automatically associated with the user when the user is not traveling. For example, the default locations may include the user's home address and/or work address. The calendar application 105, 115 may further be configured to compare the locations of the user's contacts with the user's default locations and generate a list of matching contacts. Additionally, the calendar application 105, 115 may be configured to receive a default time associated with each default location. For example, the user may input his or her work days and/or work hours, and the calendar application 105, 115 may be configured to associate the user with the user's work address during the entered work hours and the user's home address during non-work hours, and generate corresponding lists of matching contacts.

In one embodiment, the calendar application 105, 115 may further include a privacy function, in which the user may designate certain travel parameters 107, 117 as private. If the user indicates that a particular travel event is private, the calendar application 105, 115 will not transmit an alert to the user's contacts, and the user will not appear on the list of destination contacts of another user. In other embodiments, the calendar application may further allow the user to block individual contacts completely, or to filter contacts based on one or more of the travel parameters 107, 117.

The contact management function of the predictive calendar application 224 illustrated in FIG. 2 may function similarly to the embodiment shown in FIG. 1, however, the user may access the GUI of the calendar application via a client device 202, 212, and the user's profile and any entered travel parameters 226 and/or contact information 228 may be received and stored remotely on the server 220. As shown in FIG. 2, the trip parameters 226 and contact information 228 for all or some of the calendar application users may be stored on the server 220 in a memory device in the form of a database.

In one embodiment, the trip parameters 226 and contact information 228 may be stored as separate data sets in a relational database. For example, the relational database may group the trip parameters 226 and/or contact information 228 by user and organize the database by user name, including the user's first name, last name, organization name, and so on. In another embodiment, the relational database may group the trip parameters 226 and/or contact information 228 by the IP address of the user's electronic device 101, 111, or by any other identifying characteristic. As discussed above, data representing the trip parameters 107 and/or contact information 109 for each user in the network 120 may be passed from the electronic devices 101, 111 to the server 220 through any two-way communication link, including any wired or wireless link, such as a high definition multimedia interface ("HDMI") cable, a co-axial cable, structured cable, Ethernet, wireless interface, combinations thereof, and so on.

ii. Destination Information

As discussed above, the calendar application 105, 115 may further be configured to obtain destination information based on the travel parameters 107, 117 input by the user. The destination information may be received from various content sources that are communicatively coupled to the electronic devices 101, 111. For example, in one embodiment, the calendar application 105, 115 may be configured to obtain television or radio programming that is related to the destination, date, and/or time input by the user from a content provider 125. The calendar application 105, 115 may obtain the destination information at a predetermined time before the user's scheduled arrival at the destination and notify the user as to the availability of the destination information so that the user can access the information before a planned trip.

In other embodiments, the calendar application 105, 115 may be configured to receive the content signals from the content provider 125 after the user's arrival at the destination. For example, the calendar application 105, 115 may be configured to obtain the user's current location from a global positioning system ("GPS"), from a zip code input by the user, and/or from the user's IP address, and provide destination information based on the current location of the user. As such, the user need not input any travel parameters 107, 117 regarding the destination to receive corresponding destination information.

The destination information may be received from a variety of sources, including the network 120 and/or a content provider 125. The television programming may be programming that is available only locally, i.e., at the destination and its vicinity, from a local broadcast source, or non-locally from a non-local broadcast source, i.e., from a national, international, or global source. If the programming is from a local broadcast source, the calendar application 105, 115 may be configured to access the content signals from the content provider 125 using the electronic devices 101, 111 via the network 120. In some embodiments, this may be accomplished using a media streaming device, such as a Slingbox, that allows the user to remotely access content from the user's television receiver or other hardware, for example, through the network 120, using an electronic device 101, 111. Additionally, the media streaming device 115 may include a software user interface that provides channel change, volume adjustment, and/or other control functions, including fast-forward, rewind, and pause functions.

In one embodiment, the calendar application 105, 115 may be configured to search a digital guide listing scheduled broadcast television and/or radio programs, such as an electronic program guide ("EPG"), to obtain programming that is relevant to the user's destination. The EPG data may be transmitted from a local broadcast source or a non-local broadcast source. In one embodiment, metadata may be used to categorize the program listings in the EPG, thereby facilitating the search of the EPG by the calendar application 105, 115. The calendar application 105, 115 may use various search parameters for obtaining relevant destination information. For example, the application 105, 115 may be configured to search for relevant destination information using a keyword search that includes the name of the destination, and to restrict the search results by placing date and/or time restrictions corresponding to the times and/or dates specified in the user's travel parameters 107, 117. Other search parameters may include the name of a particular event or holiday that overlaps with the user's travel dates, as well as particular landmarks and/or businesses in the destination or in the vicinity of the destination. Any relevant programming obtained by the search may be flagged and transmitted as a live stream to the user's electronic device 101, 111 or downloaded for viewing at a future time.

The calendar application 105, 115 may further be configured to obtain destination information from the network 120, for example, via the Internet, a 3G network, or any other type of network that is capable of transmitting data to one of the electronic devices 101, 111. Similar to the destination information obtained from the content provider 125, the destination information obtained from the network 120 may be based on the travel parameters 107, 117 input by the user, or based on the user's calculated current location. For example, the application 105, 115 may include a search engine configured to search for relevant destination information based on the name of the destination and restrict the search results by placing date and/or time restrictions corresponding to the times and/or dates specified in the user's travel parameters 107, 117. The destination information obtained from the network 120 may be in any content format capable of transmission over the network, including audio, video, an image, an application, and so on and so forth.

The predictive calendar application 224 illustrated in FIG. 2 may function similarly to the embodiment shown in FIG. 1, however, the user may access the GUI of the calendar application 224 via a client device 202, 212, and destination information obtained from the network 120 and/or the content provider 125 may be downloaded onto the remote server 220 and accessed by the user through the network 120. Thus, in contrast to the embodiment shown in FIG. 1, in which the calendar application 105, 115 downloads destination information directly from the content provider 125 or the network 120, the destination information is first downloaded onto the server 220, and then accessed by the electronic devices 101, 111 via the GUI of the calendar application 224.

The server 220 may also be configured to receive destination information from the content provider 125 and/or from the network 120 and transmit the destination information to the electronic devices 101, 111. In one embodiment, the server 220 may store some or all of the received destination information in a memory device in the form of a database 230. The database 230 may be a relational database that groups the received destination information by the destination or location to which the content relates.

In other embodiments, the calendar application may be configured to receive parameters relating to an event, such as the name of the event, a description of the event, the location of the event, the date of the event, and/or the time of the event. The calendar application may then obtain information relating to the event through the network or from the content provider based on the name or type of event. Additionally, the calendar application may be configured to obtain a list of contacts that will also be attending the event in a similar manner to that discussed above. As an example, the event may include a trade show or a convention, and the calendar application may be configured to search for event information using either a keyword search pertaining to the topic or focus of the trade show or convention, or based on the location of the trade show or convention.

V. Operation

Figure 3:
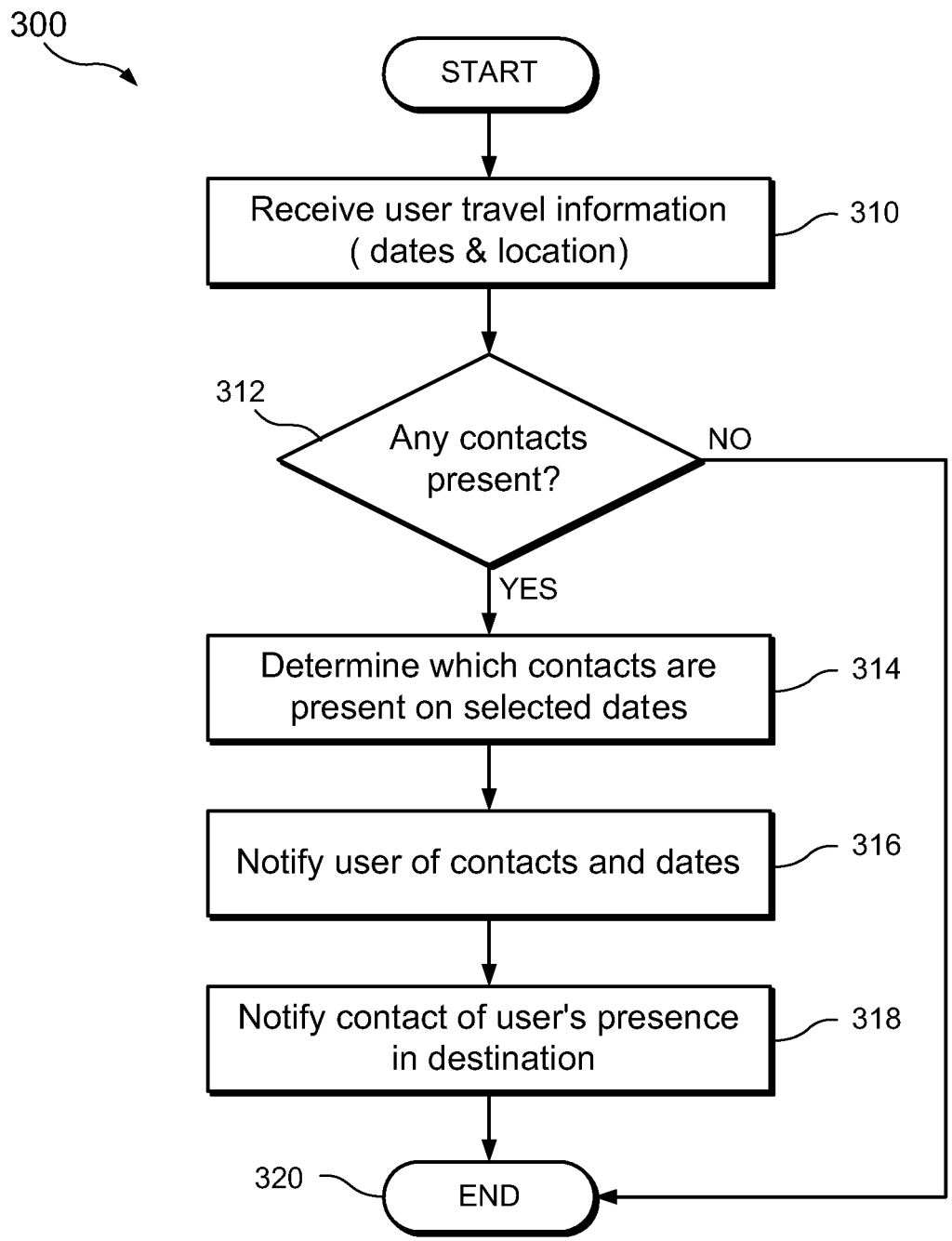
FIG. 3 is a flowchart illustrated an example of a method for managing a list of contacts using a calendar application.

FIG. 3 is a flowchart depicting operations of an embodiment of a method 300 for obtaining a list of contacts using a calendar application. The method shown in FIG. 3 may be executed by one of the electronic devices 101, 111 shown in FIGS. 1 and 2. As discussed above, the electronic devices 101, 111 may be any electronic device capable of running a calendar application, including, but limited to, a personal computing device, mobile phone, and/or television receiver.

In the operation of block 310, the calendar application may receive travel information regarding a user. For example, the GUI of the calendar application may prompt the user for the user's travel parameters, which may include the user's intended destination, as well as the user's planned travel dates and/or times. Additionally, the GUI of the calendar application may prompt the user for a list of contacts having electronic devices that are connected to the user's electronic device via a network. As discussed above, the user may add contacts to the list by using a search feature provided by the calendar application.

In the operation of block 312, the calendar application may determine whether any of the user's contacts will be present in the user's intended destination during the user's planned travel dates and/or times. As each contact is confirmed, the contact's travel schedule and locations may be imported by the calendar application and stored on the user's electronic device or on a remote server. The calendar application may compare the contact's travel schedule with the user's travel schedule to determine if there are any overlapping periods of time in which the user and the contact will be in the same location.

If, in the operation of block 312, the calendar application determines that there are overlapping periods of time in which the user and a contact will be in the same location, then, in block 314, the calendar application may determine which of the user's contacts will be present in the user's destination, as well as the dates and/or times that the contacts will be present. Additionally, in some embodiments, the calendar application may include a filtering feature for allowing a user to filter contacts based on the type of travel, for example, whether the trip is for business or personal purposes.

In the operation of block 316, the calendar application may then notify the user of the contacts and/or dates, for example, by generating an alert and transmitting the alert to the user. In the operation of block 318, the calendar application may further notify any contacts that will be present in the user's destination as to the user's presence in the destination, for example, via an alert or other notification. Any contacts that have been "filtered out," for example, via the filtering feature, will not receive a notification from the calendar application. In the operation of block 320, the method proceeds to an end state.

If, in the operation of block 312, the calendar application determines that there are no overlapping periods of time in which the user and a contact will be in the same location, then, in block 320, the method proceeds to an end state.

Figure 4:
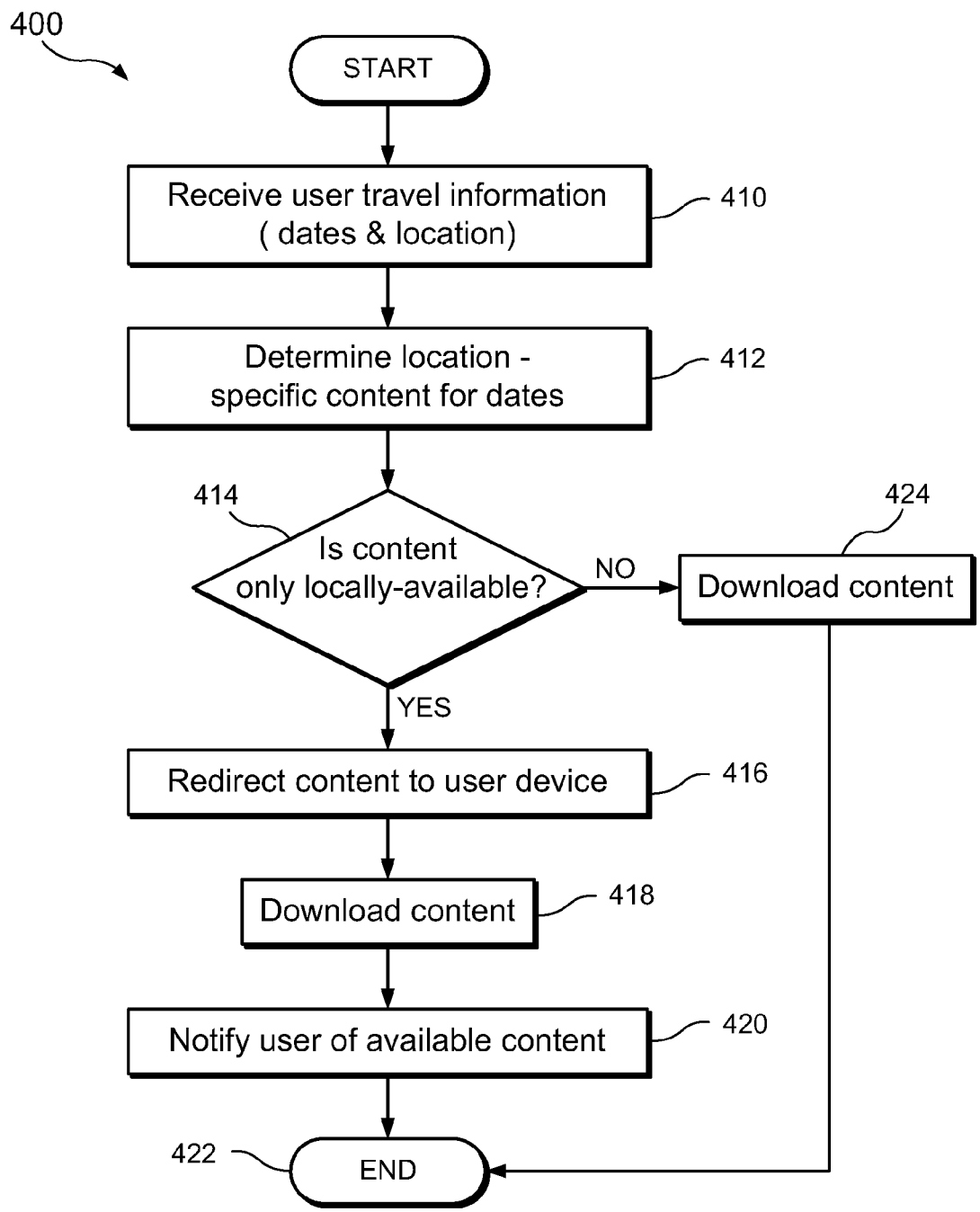
FIG. 4 is a flowchart illustrating an example of a method for obtaining destination information using a calendar application.

FIG. 4 is a flowchart depicting operations of an embodiment of a method 400 for obtaining destination information using a calendar application. Similar to the method shown in FIG. 3, the method shown in FIG. 4 may be executed by one of the electronic devices 101, 111 shown in FIGS. 1 and 2. As discussed above, the electronic devices 101, 111 may be any electronic device capable of running a calendar application, including, but limited to, a personal computing device, mobile phone, and/or television receiver.

In the operation of block 410, the calendar application may receive travel information regarding a user. For example, the GUI of the calendar application may prompt the user for the user's travel parameters, which may include the user's intended destination, as well as the user's planned travel dates and/or times. In the operation of block 412, the calendar application may determine relevant destination information for the user's intended travel dates and/or times. As discussed above, the destination information may be obtained through the network, or from a content provider, for example, a television or radio provider. In one embodiment, the calendar application may obtain relevant destination information by searching the program descriptions of an electronic program guide, or by a search engine function.

In the operation of block 414, the calendar application may determine whether the destination information is only locally available. For example, the calendar application may determine whether the destination information is from a local broadcast source. If, in the operation of block 414, the calendar application determines that the destination information is only locally available, then, in operation 416, the calendar application may redirect the local destination information from the local broadcast source to the electronic device, for example, using a media streaming device that is configured to stream the content signal from the local broadcast source over the network. In some embodiments, the calendar application may include a user interface allowing the user to manipulate the received content signal.

In the operation of block 418, the calendar application may then download the transmitted destination information. As discussed above, the destination information may be downloaded onto a memory device of the electronic device and/or an external server. In other embodiments, the destination information may be transmitted to the electronic device via a live stream. In the operation of block 420, the calendar application may notify the user that the downloaded destination information is available for viewing, and send a corresponding alert to the user. In the operation of block 422, the method proceeds to an end state.

If, however, in the operation of block 414, the calendar application determines that the destination information is not only locally available, then, in operation 424, the calendar application may download the destination information directly from the non-local broadcast source, or over the network. In the operation of block 422, the method proceeds to an end state.

VI. Conclusion

Although the embodiments have been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the present disclosure. Accordingly, the proper scope of the present disclosure is defined by the appended claims. The various embodiments, operations, components and configurations disclosed herein are generally provided as examples rather than limiting in scope.

What is claimed is:

1. A method for managing contacts using a calendar application, comprising:
    receiving, by a first calendar application on a first electronic device, first travel parameters from a first user through a first user interface of the first calendar application, the first calendar application executed on the first electronic device, and the first travel parameters including a first destination and a first set of travel dates or times;
    receiving, by a second calendar application on a second electronic device, second travel parameters from a second user through a second user interface of the second calendar application, the second calendar application executed on the second electronic device, and the second travel parameters including a second destination and a second set of travel dates or times;
    determining, by the first calendar application on the first electronic device, at a predetermined time prior to the first set of travel dates or times, whether the first and second users will be present in a particular destination for at least a partially overlapping period of time based on the first and second travel parameters;
    notifying the first user of any overlapping dates between the first set of travel dates and the second set of travel dates;
    ascertaining, by the first calendar application on the first electronic device, whether the first user has made an indication in the first calendar application indicating the first travel parameters as private;
    if the first user has not made the indication, notifying the second user of any overlapping dates between the first set of travel dates and the second set of travel dates; and
    if the first user has made the indication, omitting notifying the second user of any overlapping dates between the first set of travel dates and the second set of travel dates.

2. The method of claim 1, wherein the determining step comprises comparing the first destination with the second destination and the first set of travel dates with the second set of travel dates.

3. The method of claim 1, wherein said operation of notifying the first user of any overlapping dates between the first set of travel dates and the second set of travel dates further comprises receiving a contact list including one or more contacts from the first user, determining whether the second user is a contact of the first user based on the contact list, and notifying the first user of any overlapping dates between the first set of travel dates and the second set of travel dates if the second user is a contact of the first user.

4. The method of claim 1, wherein said operation of notifying the first user of any overlapping dates between the first set of travel dates and the second set of travel dates further comprises:
    receiving a list including one or more contacts from the first user;
    receiving a travel type from the first user;
    determining whether the second user is a contact of the first user based on the list;
    receiving a contact type from the first user regarding the second user;
    determining whether the contact type for the second user matches the first travel type; and
    notifying the first user of any overlapping dates between the first set of travel dates and the second set of travel dates if the second user is a contact of the first user, and if the contact type for the second user matches the first travel type.

5. A system for managing a calendar application, comprising:
    a first electronic device communicatively coupled to a network, the first electronic device executing a first calendar application configured to receive first travel parameters from a first user including a first destination and a first set of times or dates; and
    a second electronic device communicatively coupled to a network, the second electronic device executing a second calendar application configured to receive second travel parameters from a second user including a second destination and a second set of times or dates;
    wherein the first calendar application is configured to determine, at a predetermined time prior to the first set of travel dates or times, whether the first and second users will be present in a particular destination for at least a partially overlapping period of time based on the first and second travel parameters;
    wherein if the first calendar application determines that the first and second users will be present in the particular destination for the at least the partially overlapping period of time the first calendar application is arranged to notify the first user that the first and second users will be present in the particular destination for the at least the partially overlapping period of time; and
    wherein if the first calendar application determines that the first and second users will be present in the particular destination for the at least the partially overlapping period of time the first calendar application is arranged to notify the second user that the first and second users will be present in the particular destination for the at least the partially overlapping period of time unless the first calendar application determines that the first user has indicated that the first travel parameters are private.

6. The system of claim 5, wherein the first electronic device is further communicatively coupled to a content provider and the first calendar application is configured to obtain destination information from the network or the content provider based on the received first travel parameters.

7. The system of claim 6, wherein the first calendar application is configured to notify the first user of the obtained destination information at a predetermined time prior to the first set of travel dates or times.

8. The system of claim 5, wherein the first calendar application is further configured to determine whether the first and second users will be present in a particular destination for at least a partially overlapping period of time by comparing the first destination with the second destination and the first set of travel dates with the second set of travel dates.

9. The system of claim 5, wherein the network includes a server configured to receive and store the first travel parameters from the first user and the second travel parameters from the second user.

* * * * *

UNITED STATES PATENT AND TRADEMARK OFFICE
CERTIFICATE OF CORRECTION

| | | |
|---|---|---|
| PATENT NO. | : 8,706,093 B2 | Page 1 of 1 |
| APPLICATION NO. | : 12/702910 | |
| DATED | : April 22, 2014 | |
| INVENTOR(S) | : Antony Michael Dove et al. | |

It is certified that error appears in the above-identified patent and that said Letters Patent is hereby corrected as shown below:

On the title page

Item (75):
"Antony Michael Dove, Bradford (GB); Andrew Stanford, Baildon (GB)" should read, --Antony Michael Dove, Queensbury (GB); Andrew Stanford, Baildon (GB)--.

Signed and Sealed this
Sixteenth Day of September, 2014

Michelle K. Lee
*Deputy Director of the United States Patent and Trademark Office*